June 6, 1961  H. M. MUNCHERYAN  2,986,969
STEREOSCOPIC SIMULATION DEVICE
Filed Dec. 7, 1954  2 Sheets-Sheet 1
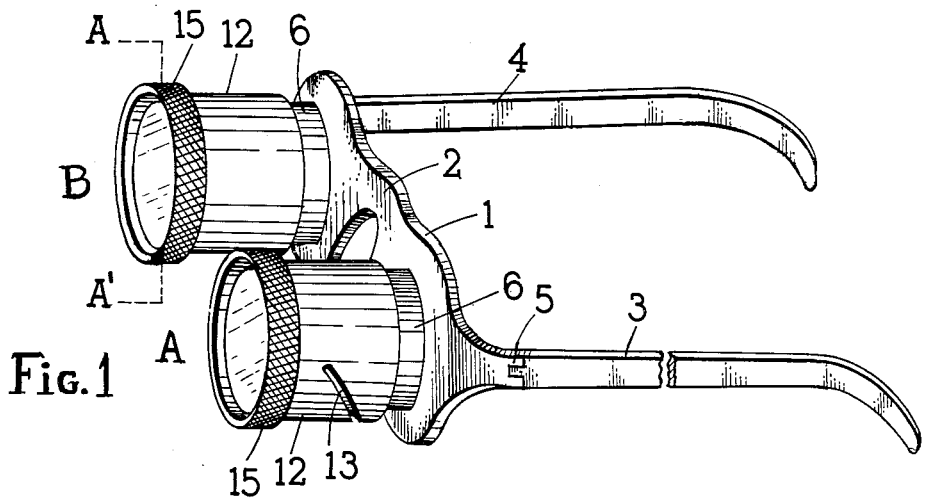
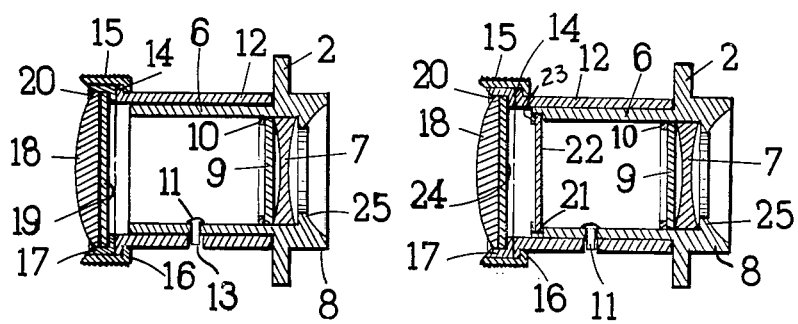
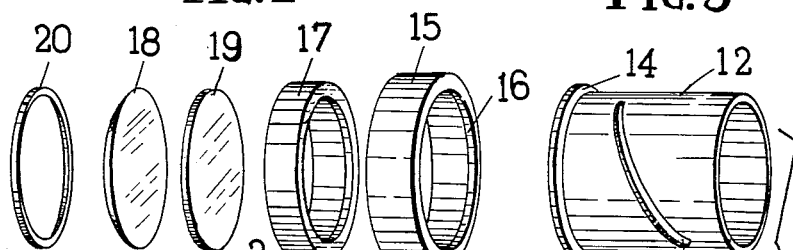
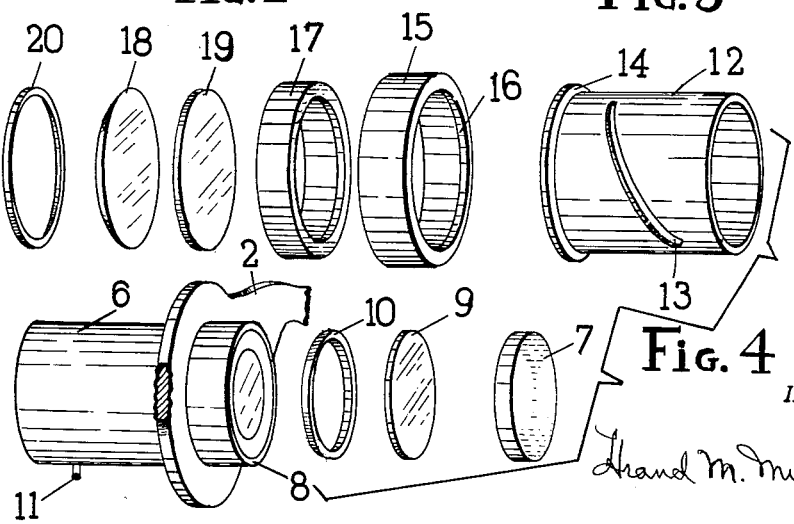
INVENTOR.
Hrand M. Muncheryan June 6, 1961  H. M. MUNCHERYAN  2,986,969
STEREOSCOPIC SIMULATION DEVICE
Filed Dec. 7, 1954  2 Sheets-Sheet 2

INVENTOR.
Hrand M. Muncheryan

2,986,969
STEREOSCOPIC SIMULATION DEVICE
Hrand M. Muncheryan, Duarte, Calif.
(1418 Gary Place, Anaheim, Calif.)
Filed Dec. 7, 1954, Ser. No. 473,717
4 Claims. (Cl. 88—41)

The present invention relates to binocular devices and concerns more particularly a system of optical means adapted to produce stereoscopic simulation of a single two-dimensional black-and-white or colored image of continuous motion on a television or motion-picture screen.

My invention has special reference to an optical depth-producing device described and claimed in my copending application for patent filed in the United States Patent Office on April 27, 1954, Serial No. 425,869, now abandoned, in which I have disclosed a means for simulating three-dimensional effect from a two-dimensional image (picture) of continuously changing position and optical density, by the use of a system of dichroic, polarizing and analyzing lenses with their planes of polarization oriented at definite angles with respect to each other. In the present invention, which consists of two telescopic viewers integrally mounted on a binocular frame, this phenomenon has been exceeded by additional optical characteristics of a combination of planoconvex and biconcave lenses, making it possible to enhance highlights of image, bring in the background, and to give apparent depth to the picture by further improving the degree of detail resolution.

The projected image (picture) on a television screen consists of a series of familiar dark horizontal lines made up of millions of tiny lens elements over the screen surface. Several lens elements constitute a single detail element of varying optical density, and a large group of detail elements form the picture. The radiation beam of the picture propagating from the screen to the observer is partially plane polarized because of the double refraction effect caused by the picture-tube glass and the protective glass shield, and of the wide-angle reflections of some of the detail elements. This phenomenon gives rise to a series of point-source wave fronts tending to produce interference and partial obliteration of the image detail by diffusion. This is the familiar halation effect or general unsharpness particularly prominent in certain types of motion-picture telecasts. This effect is detrimental not only to the clarity of the picture observed but also to the observer's eyes because of the undesirable reflections or eye-straining light glare thus produced.

The principles of polarization can be utilized to reduce glare very effectively. For small angular fields where angles of reflection are small, the radiation beam from a relatively rough or frosty surface, such as the screen phosphor, is diffused in all directions, with the major portion of the radiated beam being in the viewing field of the observer. However, large angles of reflection result in glare. In such a case the reflected light is polarized with the direction of radiation vibrations parallel to the reflecting surface (screen or glass shield). The glare is eliminated by placing a polarizing material between the eye and the reflecting surface to absorb the undesired vibrations, serving effectively as an analyzer. The transmission of wavelengths to each eye may also be made selective whereby each eye will receive different wavelengths; hence the detail element reaching one eye may be retarded with respect to the other eye. In such an event, the detail element transmitted to one eye is momentarily "frozen" whereas the other eye views the same detail element in slightly advanced position, thus enhancing a simulated third dimension to the detail structure, and hence to the picture as a whole. This is the principal mechanism which, supplemented by glare elimination and detail resolution, constitutes a principal scope of my invention.

Since with polarization of light some reduction in the total intensity of the image-radiation beam occurs, this can be partially or wholly compensated for (depending on the distance from the screen) by the use of telescopic lenses which, by virtue of their enlarging the visual angle and collecting and converging greater light beam than would enter the naked eye, increase the image-radiation intensity in accordance with the degree of their magnification power. The incorporation of the polarizers with the telescopic lenses in the present invention enhances the detail resolution coupled by detail-depth simulation of the image on the television screen.

In the present disclosure, the plane in which the polarized light waves vibrate will be referred to as the principal axis of polarization of the polarizing lens or element, and any line drawn parallel to this axis is the plane of polarization; by angle of polarization will be meant the subtended angle between two polarizing planes of polarizing elements with their surface planes occurring parallel to each other. The material which causes the light beam to become plane polarized is referred to here as plane or neutral polarizer, polarizing element (or lens), or optically effective material. A variable-color filter, to be variously referred to hereinafter as such, or as a selective or dichroic polarizer, is an optically effective color filter, since it also is a partial polarizer. As is well known in the art, a variable-color filter then is a colored polarizer (therefore a selective polarizer). For instance, a variable-color filter consists of a neutral polarizing material stained with a dichroic dye of a color such as blue, red, green, etc., and will transmit predominantly all light of wavelengths vibrating parallel to its plane of polarization and corresponding to the color of the dye used; it will absorb all other colors of wavelengths vibrating at right angles thereto. A selective polarizer, when placed with its surface plane parallel to that of a neutral polarizer (with their optical axes coincident), and rotated through a 360° angle, as in several species of my invention, the variable-color filter will alter its color hue twice from a minimum to a maximum color density during this angular interval (ordinary color filters do not exhibit this behavior). Therefore, various degrees of color depth of a given color can be obtained by the use of a variable-color filter by rotating it in front (or in rear) of a polarizing plate or element. One of the objects of the present invention is the provision of a system of plane and selective polarizers placed intermediate to converging and diverging lenses incorporated in a binocular viewer, whereby polarization, analysis, and color selection of a projected image beam from a television screen are accomplished in accordance with the angular positions of the plane and selective polarizers with respect to each other in said binocular viewer (or telescopic spectacles).

A still further object of the invention is to provide a selectively obtained light transmission through each of the two eyepieces of the spectacles in order that no fatigue will be experienced by either eye during viewing of an image. This condition is achieved by first focusing the binoculars on the image, and then rotating the plane of polarization of one polarizing lens with respect to the other in one viewer (or eyepiece) until objects viewed have attained apparent curvatures and depths (simulated stereoscopic effect). This effect is more prominent in the angular range of 35 to 50 degrees between the polarization axes of the two polarizing elements. Then the polarizing lens of the second viewer is rotated until the transmitted light intensity through this viewer is comfortable to that eye; the angle at which this effect becomes apparent is approximately 35 degrees and may vary slightly from one person to another. With such an arrangement the projected image on the screen can be viewed for an indefinite period without discomfort to the eyes.

In order to achieve optimum stereoscopic simulation, a still further object of my invention is the provision of stationary polarizers with fixed angles of polarization axes, and rotatable polarizers in parallel physical relation therewith. For instance, in one viewer of the binocular the stationary plane polarizer may be disposed with its polarization axis parallel to the horizontal plane of the device, and in the other viewer the stationary polarizer axis may be disposed 22.5 degrees from the vertical plane and 67.5 degrees with respect to the plane of polarization of the stationary polarizer in the first viewer. This arrangement will permit the orientation of the respective rotatable polarizers in the two viewers to image-depth simulating positions at will. Each of the species disclosed in the drawing embodies this system of orientation of polarization angles.

For viewing color motion pictures or color television pictures, a still further object of the invention is the provision of variable-color filters of the dichroic polarizing type in conjunction with neutral polarizing lenses (polarizers). In such an embodiment, each eyepiece or viewer consists of the usual telescopic lenses (converging and diverging lenses), one or more polarizers, and one or more variable primary-color filters. All of these optical components (elements) are arranged on a common optical axis, the only difference between the two viewers being the employment of a different variable-color filter in each viewer. For instance, one viewer may have a red variable-color filter while the other a blue or green variable-color filter, or each viewer may have a combination of red and green, or blue and yellow, or any combination thereof.

As a modification of the principal species, my invention may be provided with a system of fixed-angle polarizers and variable-angle variable-color filters, or fixed-angle variable-color filters and variable-angle polarizers, or combinations thereof. Any one type of these arrangements is particularly useful in achieving three-dimensional effects of color motion pictures, color television pictures, and color cartoons.

Other advantages of my invention reside in the provision of an image-depth producing device of the aforementioned character which is simple in construction, efficient and reliable in performance, compact, and inexpensive to manufacture. These advantages will be more apparent from the following specification taken in conjunction with the accompanying drawings, wherein I have illustrated preferred forms of embodiments of my invention.

FIGURE 1 is the perspective view of the optical image-depth producing device.

FIGURE 2 is a sectional view of an isolated viewer (such as B) of the embodiment shown in FIGURE 1 taken on line A—A', with the ear-piece section neglected.

FIGURE 3 is the sectional view of a modified embodiment.

FIGURE 4 is an exploded view of the embodiment shown in FIGURE 1 (sectionally shown in FIGURE 2).

Figure 5:
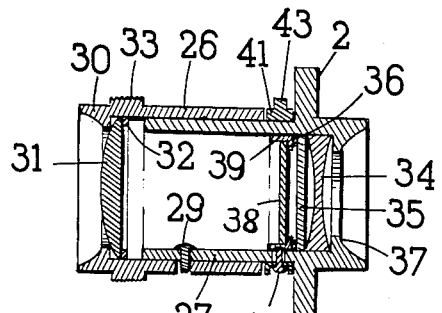

FIGURE 5 presents the sectional view of still another modified embodiment of my invention, with the movable polarizer being rotatable independently of the converging lens.

Figure 6:
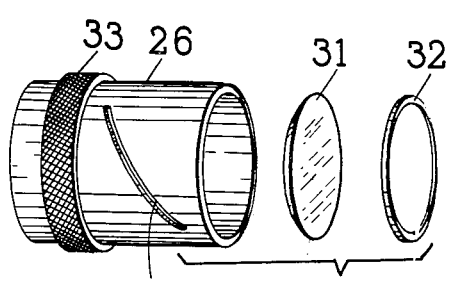
Figure 7:
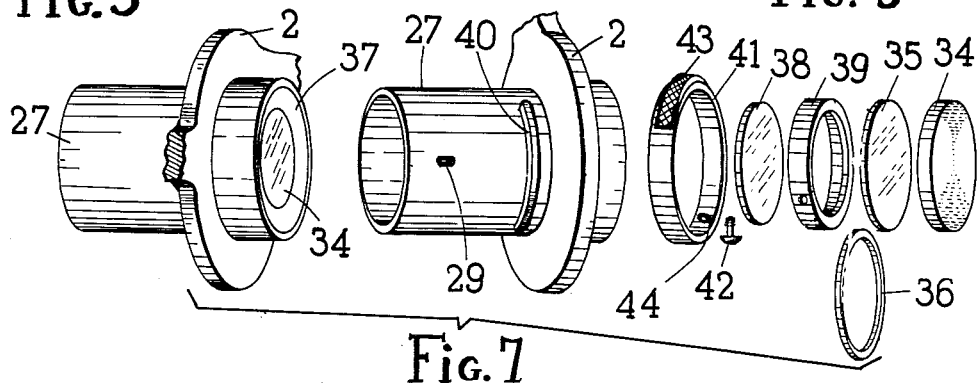

FIGURES 6 and 7 are the exploded views of the embodiment shown in FIGURE 5.

Figures 8, 9, 10, 11:
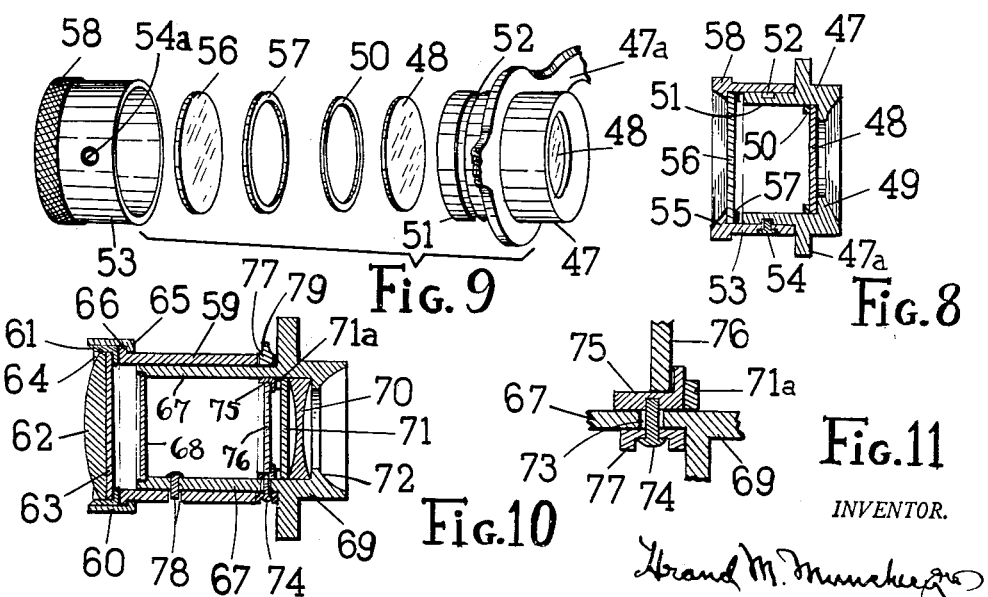

FIGURE 8 is a sectional view of still another embodiment of the invention containing a polarizer and variable-color filter combination.

FIGURE 9 is an exploded view of the embodiment shown in FIGURE 8.

FIGURE 10 is the sectional view of still another modified embodiment of my invention, showing the arrangement of two polarizers and two variable-color filters or a combination thereof located intermediately to a planoconvex and a biconcave lens, and FIGURE 11 is the detail sectional view (magnified) of pin engagement between the lens retainer and the lens-rotator band structure presented in FIGURES 5 and 10.

Referring now to the drawings, wherein similar reference characters refer to similar parts throughout the several views thereof, the reference numeral 1 denotes a binocular frame made of a suitable material such as metal, plastic, or composition material, and having two telescopic viewers A and B which are interconnected at the bridge section 2 and are appended by the ear pieces 3 and 4 hinged to the frame 1 in the manner shown at point 5. Each of said viewers A and B contains a set of two optical lenses, two or more plane polarizers, and one or more variable-color filters. For sake of simplicity of illustration, I have chosen to describe the viewer B in the embodiment sectionally shown in FIGURE 2 (also in the succeeding species), since both viewers A and B are identical. The viewer B consists of an inner tubular lens receptacle or barrel 6 which contains a biconcave eyepiece lens 7 mounted in the eyepiece mount 8. Mounted forwardly to the eyepiece lens 7 and on the same optical axis is a polarizer 9, made of plastic or other transparent material, and is retained in the barrel 6 by means of a guard ring 10, which is cemented to the barrel 6. A pin 11 is mounted midway on the outside periphery of barrel 6.

An outer barrel 12 with a diagonal slot 13 telescopes over the tubular member 6 when rotated, so that the slot 13 diagonally slides guided by the pin 11, by moving the barrel 12 backward or forward, depending on the direction of rotation. By this operation, the observer can adjust the distance of the lenses to focus the image. For instance, when the image is nearer to the observer, the outer barrel 12 is rotated so that it moves away from the observer's eye, and when the image is farther from the observer, the barrel 12 is rotated to move toward the observer. In this manner, different individuals can adjust the binoculars to suit their eyes. Even at times, with certain individuals, the adjustment for one eye may be different from that of the other, depending on the eye condition of the person; and this adjustment is possible to accomplish with the present invention, since each viewer A and B is adjusted independently of the other.

The front end of the outer tube 12 is flanged as at 14, so that the annular housing 15, correspondingly provided with an inwardly directed flange member 16, can rotate freely about the periphery of the barrel 12 in engaged relation thereto. The annular housing 15 contains a lens mount 17 which embodies a planoconvex or condensing lens 18 and a polarizing discal lens or element 19 adjacent and behind it. Both the lens 18 and the polarizer 19 are sealed in the lens mount 17 by means of the ring 20 cemented thereto. The assemblage of the lens mount 17 in the housing member 15 will be presently described with the exploded view shown in FIGURE 4.

In FIGURE 3, the numerical designations as given in FIGURE 2 are conserved, since all component parts in this embodiment are identical with those shown in FIGURE 2, with the exception of the FIGURE 2 polarizer 19, which in FIGURE 3 is replaced to an internally recessed portion 21 of the inner tubular member 6 and is designated by the numeral 22. An annular guard 23 being cemented in front of polarizer 22 secures it therein. In this embodiment, the angular orientation of the polarizers 9 and 22 are fixed. I prefer to use an angular divergence of 45 degrees between the principal polarizing axes of the two polarizers 9 and 22. The angular divergence of 45 degrees is chosen because of the variance of this angle from 35 to 50 degrees with different individuals. The numeral 24 designates a variable-color filter placed posteriorly to the condensing lens 18. Upon focusing the image by telescopically moving the lens 18 with respect to lens 7 in FIGURE 3, the housing 15 may be rotated clockwise or counterclockwise independently of barrel 12, until a suitable color density is produced as determined by the observer. If the variable-color filter incorporated in the telescopic viewer A is red the variable-color filter in its companion viewer B will be blue or green; in any case, the two viewers A and B will have different variable-color filters; for instance, red in A, blue in B, or vice versa; green in A and red in B or vice versa; yellow in A and green or blue in B or vice versa, etc. All other optical components and constructions remain the same in both A and B.

FIGURE 4 presents an exploded view of the telescopic viewer B, sectionally shown in FIGURE 2 (A would be the same), in which, for assembly, the polarizer 19 is inserted into the lens mount 17, then the lens 18 is placed over it with its flat surface next to the polarizer. A suitable cement is applied to the outside periphery of ring 20 and then the ring is pressed over the lens to permanently secure both the lens 18 and the polarizer 19 in the lens mount. The annular housing 15 is slipped over the barrel 12 and pushed forward until the flange 16 makes contact with flange 14 of barrel 12. The outer periphery of lens mount 17 is applied with a suitable cement and the unit is inserted into the housing 15 so that it is completely enclosed therein. In this manner the housing 15 can be rotated on flange 14 of barrel 12, for adjusting the principal axis of the polarizer 19 with respect to that of the polarizer 9. The components of barrel 6 are also shown in an exploded view (FIGURE 4). In similar manner, the lens 7, the polarizer 9 (with polarization axis oriented properly), and the annular guard 20 are inserted, in that order, into the barrel 6 so that they are snugly positioned therein, with the rim of the lens 7 in abutting relation to the annular shoulder 25. The ring 10 may be cemented therein so that the lens 7 and the polarizer 9 can be permanently fixed in the eyepiece holder 8. The embodiment in FIGURE 3 may be assembled in a similar manner.

In FIGURE 5, a still other modified embodiment of my invention is shown in sectional view. The viewer consists of an outer barrel 26 and an inner barrel 27, on which the outer barrel 26 telescopes. The telescopic action is achieved by means of a diagonal groove 28 in the wall of the barrel 26 which slides, when rotated, over a pin 29 pivoted on the inner barrel 27, and thus moves forward or backward, depending on the direction of rotation (of the barrel 26). In the front end of barrel 26 is a recessed annular shoulder 30 at which a condensing lens 31 is secured by means of a ring guard 32, which is press-fitted therein. The peripheral band 33, which is integral with barrel 26, is knurled on its outer surface so as to facilitate the rotation of the barrel 26 to telescopically adjust the optical distance between the converging lens 31 and the diverging lens 34 for focusing. The inner barrel 27 is integral with the bridge 2 of the binoculars, and contains the biconcave lens 34, which is the eyepiece lens. Immediately forward to lens 34 is a polarizing member 35 held against the lens 34 by means of the guard 36 cemented therein by a suitable binder. The lens 34 is in abutting relation to the annular shoulder 37 formed on the eyepiece end of the inner barrel 27.

Anteriorly located to the polarizer 34 is a second polarizer 38 (which could be substituted by a variable-color filter) mounted in a lens mount 39 by suitable means, such as press-fitting or cementing. In register with the lens mount 39 are a slot 40 (FIGURE 7) in barrel 27 (extending about one-third the circumference of the barrel 27) and a relatively narrow circular band 41 on the outside periphery of barrel 27. The band 41 is secured to the lens mount 39 by means of a pin 42 (see FIGURE 11) so that when the band 41 is rotated, the lens mount 39 and hence the polarizer 38 mounted therein rotate with the band 41. The rotation of the polarizer 38 with respect to polarizer 35 varies the degree of image-beam polarization. Since the extent of the slot 40 is such (120 degrees) that it enables the rotation of band 41 (hence the polarizer 38) through an angle more than 90 degrees, a maximum and minimum polarization can be obtained by a rotation to the full extent of the slot. The band 41 is provided with a raised section 43, the top surface of which is knurled, to facilitate rotation of the band 41. Diametrically opposite to the raised section 43 of band 41 is a circular aperture 44 through which the pin 42 is inserted to be threadedly engaged to lens mount 39.

In FIGURE 8 is still another modified embodiment of my invention, in which the viewer consists of an ocular member 47 containing a polarizer 48 secured between the annular shoulder 49 and the ring guard 50 cemented on the inside wall of the barrel 51 integral with member 47, which, in turn, is integral with the ocular frame 47a. The angle of polarization axis of the polarizer is fixed at a definite position. I prefer to employ a range of angles between 17.5 degrees to 25 degrees with respect to the vertical plane and the angle being directed toward the bridge of the optical system. The axis of polarization of the polarizer in the companion viewer (e.g. viewer B) is also fixed and is parallel with the horizontal plane; thus the two companion polarizers form an acute angle of 65 to 72.5 degrees between their polarization planes.

On the external surface of the barrel 51 and at its midsection is a peripheral groove 52. An external barrel member 53 is rotative around the inner barrel 51 and is guided thereupon by a pin 54 located in an aperture 54a midway along the axial length of the barrel 53 and in register with the groove 52 (FIGURE 9). As the barrel 53 is rotated, the pin 54 moves in the groove 52 so that barrel 53 is both guided and thereby rotatively engaged on the barrel 51. The front end of barrel 53 is flared inwardly and forms an annular shoulder 55 thereon. Internally to barrel 53 and against the shoulder 55 rests a discal polarizing element 56 secured therein by means of the ring or washer 57 cemented against the inside wall of barrel 53 by a suitable binder. The external periphery of barrel 53 contains a knurled band 58 integral therewith adjacent the flared end.

For angular orientation of the polarizers 56 and 48, the knurled band 58 of barrel 53 is rotated until a stereoscopic simulation of the observed image (picture) is obtained. This angle of orientation falls within a range of 35 to 50 degrees of angular difference between the polarization planes of the polarizers 48 and 56. For instance, if the polarization axis of the polarizer 48 were fixed during the fabrication at 20 degrees with respect to the vertical, then a 20-degree rotation of polarizer 56 to the opposite side of the vertical will give an angular difference of 40 degrees between the two polarizers. This angular value being within the range stated above will produce a stereoscopic simulation of the picture viewed. The rotative polarizer in the companion eyepiece (viewer), whose fixed-angle polarizer plane is parallel with the horizontal plane, will be similarly adjusted to a suitable angular aspect dependent on the individual observer and will be variable with his judgment of optical orientation, which is not critical since an angular error of 15 degrees (50−35=15 degrees) is tolerable. In this construction, the rotative polarizer in one of the viewers can be made of a selective polarizer or variable-color filter (instead of neutral polarizer). A variable-color filter is a dichroic polarizer, and may be so constructed that any two dichroic polarizer elements placed face to face and rotated up to 90 degrees may produce a gradual color change from one end of the visible spectrum to the other end.

FIGURE 10 presents a still other modified embodiment of my invention in which each of the two viewers (A and B) contains principally two telescopic optical lenses (each lens may have additional lenses for optical correction, i.e., for eliminating chromatic aberrations), two polarizers, and at least two variable-color filters. I prefer to make one of each type of optical element (lens or filter) stationary and the companion element (in the same viewer) movable for changing either the optical distance, such as between the compound lenses, or angular positions, such as the planes of polarization of the polarizers and variable-color filters. In the figure, numeral 59 is the outer telescopic barrel (similar to barrel 12) having a rotatable front annular housing 60 (similar in construction to housing 15) which contains the lens holder 61 (also similar in construction to that designated by numeral 17). A condensing lens 62 (which may consist of several optical correction elements for eliminating aberration) and a variable-color filter or dichroic polarizing element 63 are mounted in the lens holder 61 and secured in it by means of the annular guard 64 cemented peripherally therein. An internally directed flange 65, on the rear edge of housing 60 and an externally directed flange 66 at the front end of the barrel 59 are engaged together and enable the free rotation of the member 60 on the barrel 59. The rotation of the housing 60 varies the angular aspect of the optical element 63 with respect to other dichroic polarizing elements presently to be described.

Numeral 67 designates the inner telescopic barrel which is similar in construction to barrel 27 of FIGURE 5 or 7, with the exception that its front end opposite to variable-color filter 63 is recessed in its internal periphery to receive a second variable-color filter 68, which is secured therein by a suitable binder. The eyepiece section 69 contains a diverging (biconcave) lens 70 (for reason of simplicity of illustration, the corrective lens elements which may be used are not shown), and a polarizer 71 secured therein by a ring guard 71a, adjacent to the internal shoulder 72 of the eyepiece section 69. The plane of polarization of element 68 is at 45 degrees (as between elements 24 and 9), with respect to that of element 71, whose polarization axis is parallel with the horizontal plane. A peripheral slot 73 (FIGURE 11) similar to that presented by numeral 40 of FIGURE 7 is formed in barrel 67, in which a guide pin 74 enables the lens mount 75 containing a neutral polarizer 76 to rotate inside the barrel 67 by the rotation of the annular band 77 (similar in construction to band 41 of FIGURE 7). The barrel 77 is connected to lens mount 75 by means of the guide pin 74 which slides in the slot 73 of the barrel 67. A magnified view of arrangement of the band 77, pin 74, lens mount 75, and neutral polarizer 76 is shown in FIGURE 11. The barrel 59 telescopes on the barrel 67 by means of the slot-and-pin arrangement 78 similar in construction to slot 13 and pin 11 arrangement shown in FIGURE 4.

With the embodiment shown in FIGURE 10 it is possible to achieve intensification of the image by use of the optical lenses 70 and 62, elimination of halo and glare effects together with stereoscopic simulation by means of the elements 71 and 76, and image color depth (for color pictures) by means of the variable-color filters 63 and 68, which filters may or may not be of the same color. To accomplish stereoscopic simulation for black-and-white images, the rotatable polarizer 76 and the variable-color filter 63 are rotated to chromatically neutral positions (a neutral position is one in which the greatest light transmission is obtained through the present viewer), and then the barrel 59 is telescopically rotated until the image viewed becomes in focus; this focusing operation shifts the variable-color filter 63 out of the neutral position. Therefore, the member 63 is rotated back to a neutral position. Subsequently, the polarizer 76 is rotated by means of the lens-rotator 77 at finger rest 79 (similar to 43 of band 41) until a stereoscopic effect of the image is simulated. The companion viewer (e.g., viewer B) is similarly adjusted. The device is now ready for simulated stereoscopic viewing.

When it is desired to view a color picture by stereoscopic simulation, the image-focusing adjustment (as made above) remains unchanged. The position of the adjusted polarizer 76 also remains unchanged. Only the position of the variable-color filter 63 need be changed by trial rotation of the housing 60 (which contains element 63) clockwise or counterclockwise until the deepest color (red, blue, or green, as its color may be) of the variable-color filter 63 is obtained. In this position, the variable-color filter 63 is oriented at right angles (90 degrees) with respect to the polarization plane of the polarizer 71. After the companion viewer is also adjusted in like manner, the device is ready for operation. (Polarization axis of variable-color filter 68 is parallel to that of polarizer 71.)

The foregoing illustration describes a method of image intensification, stereoscopic simulation, and optical color analysis as produced simultaneously by means of the arrangement disclosed in the drawing. It presents a simple phase of simulation of color stereoscopy. However, numerous other color and stereoscopic combinations are possible by altering the angular positions of the variable-color filter 63 and the polarizer 76 by rotating the members 60 and 77, respectively. The companion viewer, that is the viewer B, is constructed and functions in exactly the same manner, and therefore its construction and operations need not be described herein.

I have thus provided a binocular optical system which is capable of amplifying the intensity of radiation of the image viewed, increasing contrast, eliminating glare, and halo effect, producing illusion of three-dimensional effect by producing optical depth and rendering clarity to the image, and producing color balance (for color image projection) necessary especially in the case of motion-picture telecasts, i.e., when image is not a direct broadcast, as in majority of cases. Although I have illustrated and described the preferred embodiment of my invention, it is understood that various changes may be made in the invention without departing from the spirit and scope thereof, and therefore the invention is not limited by that which is shown in the drawings and described in the specifications but only as indicated in the appended claims.

I claim:

1. An optical device for producing illusion of depth, comprising a pair of polarizing optical systems secured on an ocular frame having means for supporting same in front of an observer's eyes; compound lenses in each of said optical systems and a plurality of neutral and dichroic polarizing elements disposed intermediate to said compound lenses to produce variations in the intensity of light passing through said compound lenses, one of said neutral and one of said dichroic polarizing elements being stationary with an orientation angle of 45 degrees between said stationary polarizing elements, and the orientation angle between the left stationary neutral polarizer and the right stationary neutral polarizer being 67.5 degrees; rotatable means in each of said optical systems and polarizing elements secured to said rotatable means for rotating the polarization axes of said polarizing elements with respect to said stationary polarizers for producing unequal color densities in each of said binoculars and thereby creating an illusion of depth effect from a two-dimensional moving picture projected on a screen.

2. In an optical device for producing illusion of depth, comprising a pair of telescopic optical systems adapted to be worn in front of the eyes, each of said optical systems containing an adjustable converging lens coupled with a first dichroic polarizing element disposed internally thereto, and a stationary diverging lens coupled with a first stationary neutral polarizer and a second stationary dichroic polarizing element placed at a suitable orientation angle with respect to said neutral polarizer to produce least polarization of light passing through said converging lens, and a second neutral polarizer disposed between said second dichroic polarizing element and said first neutral polarizer, and means secured to said second neutral polarizer in each of said optical systems to vary the orientation angles between the polarizers therein and between the polarizers contained in both of said optical systems independently to each other for producing variations of color densities and variable degrees of polarization of image light passing through said optical systems, thereby creating an optical illusion of depth effect from a two-dimensional image projected on a screen.

3. An optical device for producing illusion of depth, comprising a pair of light-polarizing optical viewers arranged side by side on an ocular frame, each of said viewers being telescopic independently of the other and consisting of an inner barrel integral with said ocular frame, and an outer barrel telescopically disposed on said inner barrel; each of said inner barrels containing a diverging lens and a stationary neutral polarizer adjacently positioned thereto, an annular lens mount containing a second neutral polarizer rotatably disposed adjacent to the first neutral polarizer to vary the polarizing plane of incident light therethrough, and a stationary dichroic polarizer located at the opposite end of said inner barrel and in remote relation to said second neutral polarizer; a peripheral slot in said inner barrel and in alignment with said lens mount; an annular band on the outer periphery of said inner barrel, with a pin slidably disposed in said slot and in engagement with said annular band and said lens mount, for rotating said second neutral polarizer in said lens mount relative to both of said first polarizer and said dichroic polarizer; the outer barrel having a lens mount containing a field lens and a second dichroic polarizer adjacently located therewith and in opposite relation to said first dichroic polarizer; said dichroic polarizers in conjunction with said neutral polarizers constituting a train of variable color filters; said lens mount on the outer barrel being adapted to rotate said field lens together with said second dichroic polarizer relative to said first dichroic polarizer and said neutral polarizers and independently of the telescopic action of said outer barrel, for producing illusion of depth effect of a moving color picture projected on a screen.

4. An optical depth-producing device, comprising a pair of light-polarizing optical systems arranged side by side on an ocular frame having means for supporting same in front of an observer's eyes; each of said optical systems consisting of an inner barrel integral with said frame, and an outer telescopic barrel rotatively slidable over said inner barrel; said inner barrel containing at one end a biconcave eyepiece, a stationary neutral polarizer adjacent to said eyepiece, a lens mount containing a second neutral polarizer in adjacent relation to said first neutral polarizer and rotative relative thereto to alter the plane of polarization of light passing therethrough, and a variable-color filter of the dichroic polarizing type secured to the opposite end of said inner barrel and with its polarization plane oriented at 45 degrees with respect to said stationary neutral polarizer for producing a constant residual polarization; an arcuate slot in the wall of said inner barrel and in register with said lens mount, an annular member covering said slot on the outside periphery of said inner barrel and a pin through said slot securing said annular member to said lens mount so that when said annular member is rotated said lens mount together with said neutral polarizer disposed therein rotate therewith; said outer barrel being provided at the end opposite to said eyepiece with a lens housing containing a plano-convex lens together with a second dichroic polarizer, both of which being rotative 360 degrees with respect to said outer barrel, whereby said dichroic polarizer in said housing and said rotatable neutral polarizer in said lens mount are rotative independently of each other, with respect to the stationary polarizers thereof, and independently of the polarizers in the other optical system, for producing variable color densities in both of said optical systems and thereby an illusion of depth effect of a single moving color picture projected on a screen.

References Cited in the file of this patent

UNITED STATES PATENTS

| | | |
|---|---|---|
| 988,081 | Denman | Mar. 28, 1911 |
| 1,636,450 | Ames | July 19, 1927 |
| 1,851,579 | Hixon | Mar. 29, 1932 |
| 1,879,793 | Chubb | Sept. 27, 1932 |
| 2,298,058 | Land | Oct. 6, 1942 |
| 2,304,504 | Metzger et al. | Dec. 8, 1942 |
| 2,380,481 | Tillyer et al. | July 31, 1945 |
| 2,408,772 | Glasser | Oct. 8, 1946 |
| 2,625,855 | Gaylor | Jan. 20, 1953 |

FOREIGN PATENTS

| | | |
|---|---|---|
| 395,479 | Germany | May 21, 1924 |
| 996,753 | France | Sept. 5, 1951 |